Inventor.
Kurt B. Bredtschneider.
By Joseph C. Lange Atty.

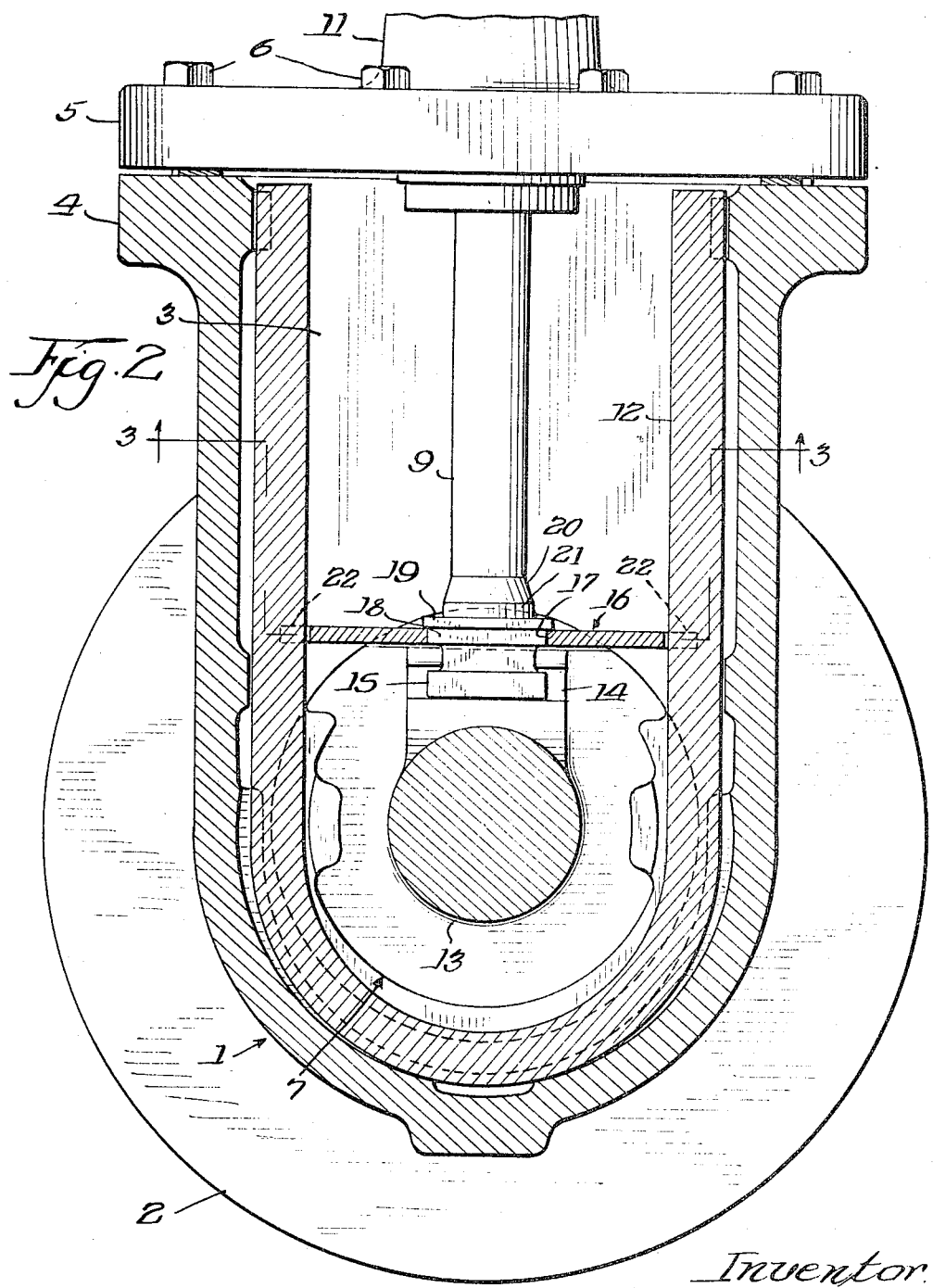

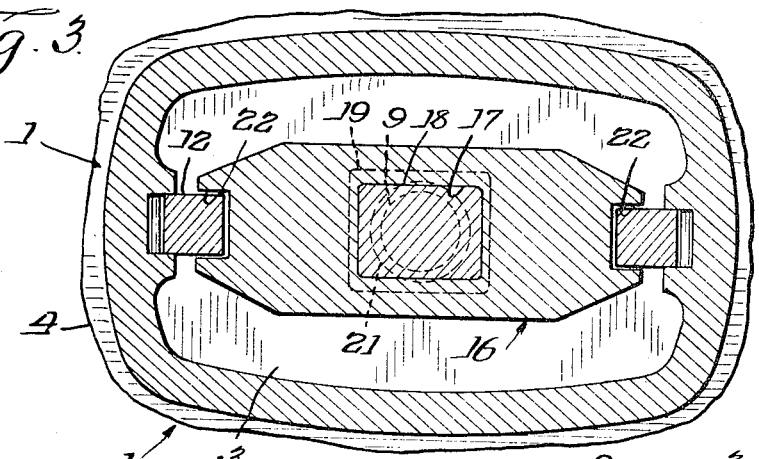
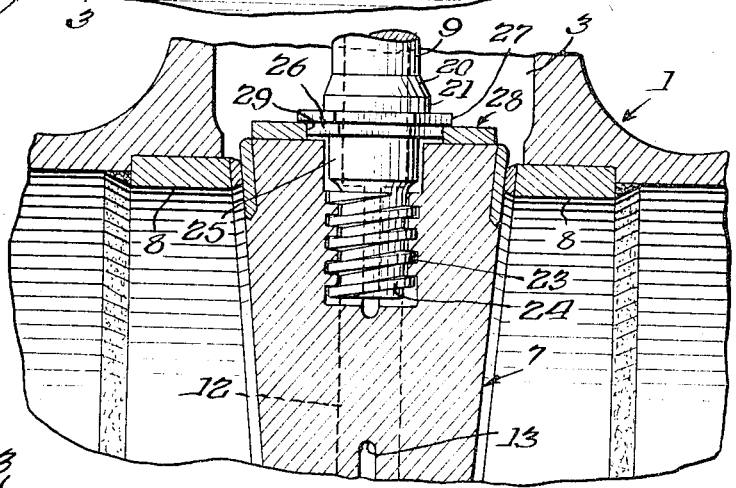
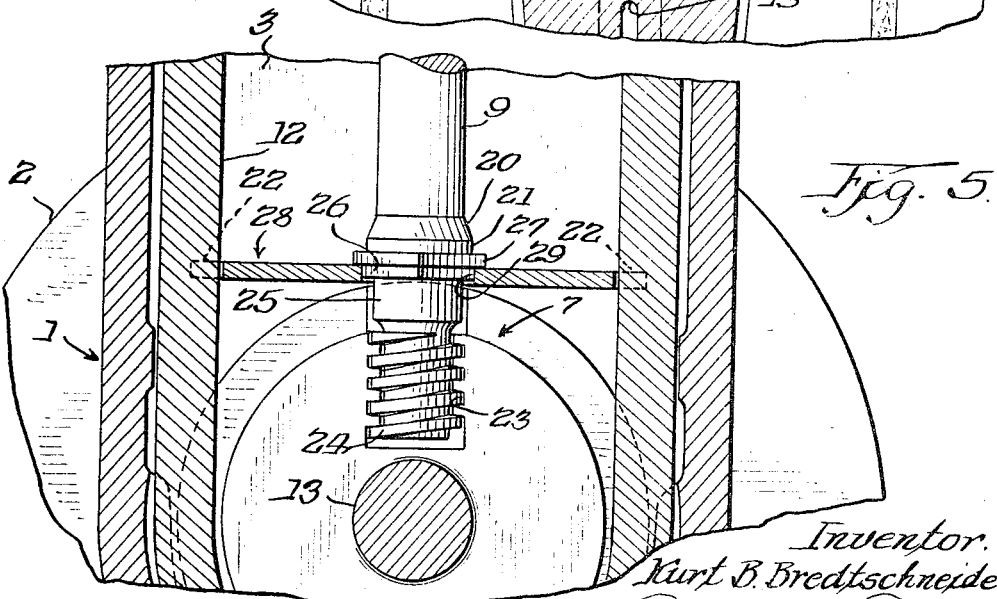

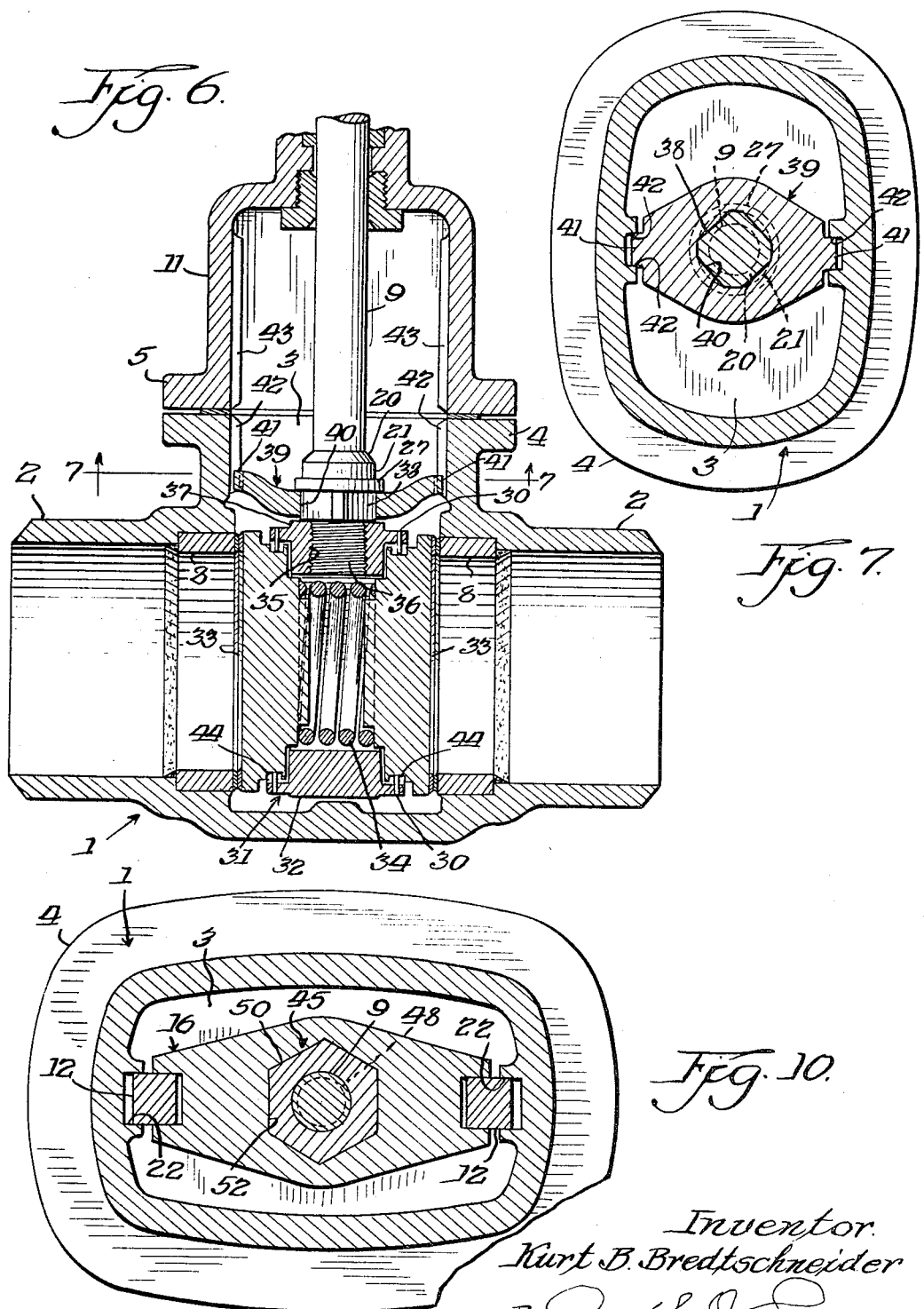

Inventor.
Kurt B. Bredtschneider.
By Joseph O. Lange
Atty.

United States Patent Office 3,282,559
Patented Nov. 1, 1966

3,282,559
TORQUE PLATE FOR VALVES
Kurt B. Bredtschneider, Chicago, Ill., assignor to Crane Co., Chicago, Ill., a corporation of Illinois
Filed June 1, 1964, Ser. No. 371,600
11 Claims. (Cl. 251—327)

This invention relates generally to a torque plate for fluid valves, and, more specifically, it is concerned with a plate-like means employed for the purpose of beneficially distributing the torque load applied by the actuator mechanism or valve stem in opening and closing the valve.

At the outset, in order to have a better appreciation of the merits of this invention, it should be understood that in fluid control means, such as conventional gate valves, for example, during the course of operating a handwheel or motor-driven actuating means, torque is transmitted from the handwheel or motor-driven means by the disc stem connection to the valve closure member and from the latter location to the guide ribs of the valve body. It will thus be understood that as permitted by such side clearance as may be provided between the width of the closure member and the width of the guide ribs provided in the valve body or casing the closure member frequently becomes misaligned in relation to its seat during the closing movement of the valve. It will, of course, be obvious that such misalignment of the closure member is very objectionable because during such travel of the closure member as referred to, the closure member will contact the valve seat on at least two points or lines, eventually causing scratching, scoring, galling and serious valve failure in the way of leakage.

It will be further understood that so long as torque is being applied under such conditions no uniform specific seat load can be obtained. When the valve is seated, the torque condition referred to is of minor importance.

Therefore, it is one of the more important objects of this invention to provide a novel, economical, and durable construction in which the torque from the valve stem or shaft is transmitted directly from the stem or shaft to the valve body, so that the closure member can align itself easily and conveniently to the valve seats unhindered by the usual forces of rotation.

Another object is to provide for a torque plate construction and application by which the attachment thereof is easily accomplished and is preferably attached non-rotatably to the valve stem above the connection between the valve stem and the closure member.

Another object is to provide for a torque plate construction for valves or the like in which the torque plate engages the valve body or casing guide ribs with substantially closer tolerances than does the valve closure member itself and transmits the rotation forces of the stem directly to the valve body, thus providing that the closure member is free to align itself to the valve seats.

Other objects and advantages will become more readily apparent upon proceeding with the following description read in light of the accompanying drawings, in which:

FIG. 2 is a sectional assembly view transverse to that construction shown in FIG. 1;

FIG. 3 is a fragmentary sectional view taken on the line 3—3 of FIG. 2;

FIG. 4 is a fragmentary sectional view of a modified form of valve application of the invention in a rising stem gate valve;

FIG. 5 is a sectional view transverse to that shown in FIG. 4;

FIG. 6 is a fragmentary sectional assembly view showing the invention applied to a double disc parallel seat rising stem gate valve;

FIG. 7 is a sectional view taken on the line 7—7 of FIG. 6;

FIG. 10 is a transverse sectional view taken on the line 10—10 of FIG. 9.

Similar reference numerals refer to similar parts throughout the several views.

Figure 1:
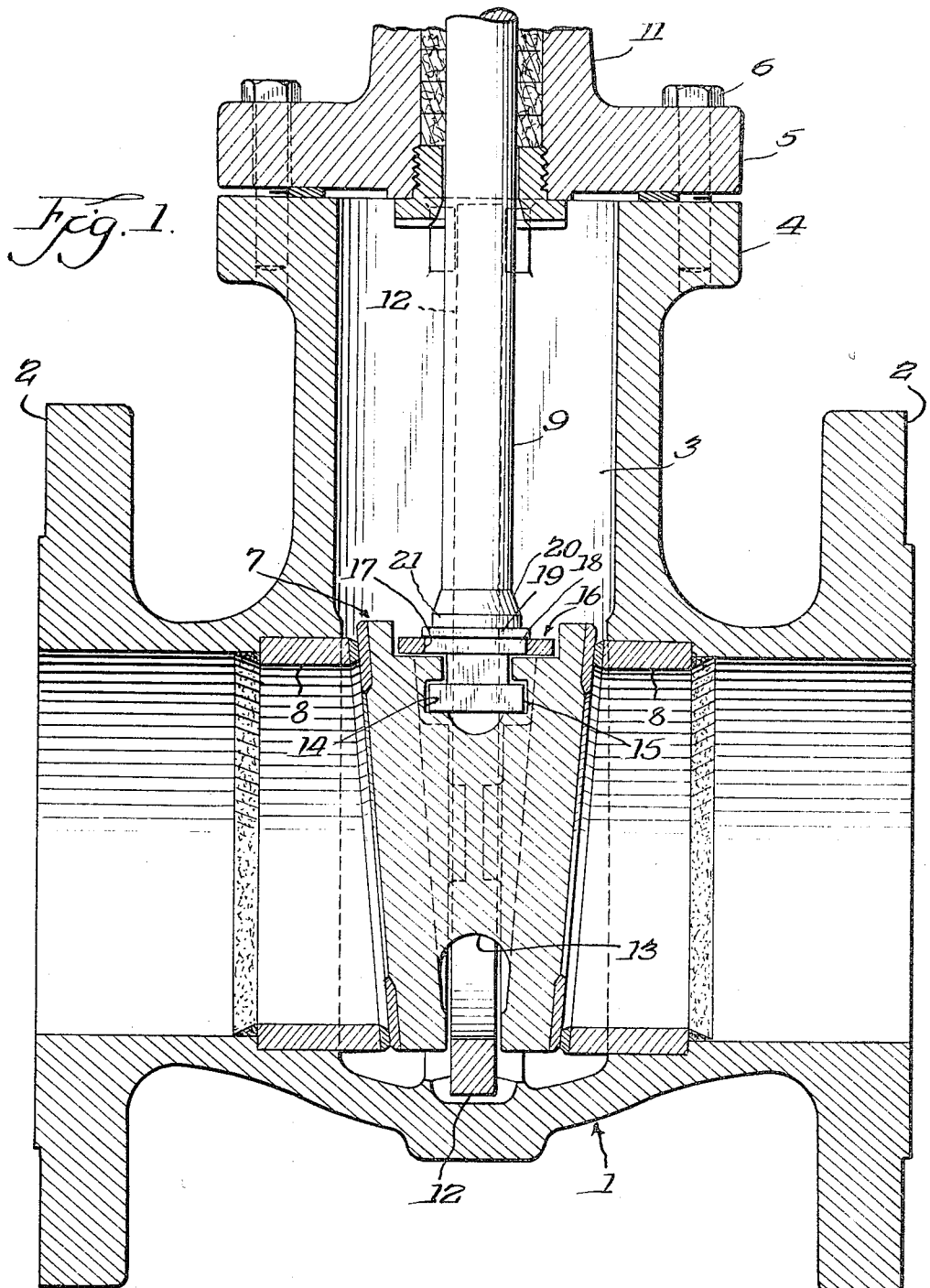
FIG. 1 is a fragmentary sectional assembly view of one form of gate valve employing my invention specifically applicable to a rising stem type of valve construction.

Referring now to FIG. 1, a conventional valve body construction is shown with the valve casing or body designated 1 and having the usual end disposed pipeline connecting ends 2 and having between said connecting ends the interposed valve casing chamber 3. Integral with the upper limits of the valve body 1, a bonnet flange 4 is provided for attachment of the usual valve bonnet flange 5 held securely to the valve casing 1 by means of the bonnet bolting 6.

For purpose of effecting the opening and closing of the valve, a flexible wedge type of disc or closure member 7 is provided bearing in the closed position in abutting relation against the oppositely disposed annular valve seats 8. The valve closure member in its reciprocating movement is actuated by means of the valve stem 9 and is journalled in the bonnet 11 in the usual manner as shown.

In this particular construction, the valve body 1 in the chamber 3 is fitted with a removable horseshoe guide member 12 which functions to guide closure member in the manner and for the purpose set forth in greater detail in U.S. Patent No. 3,078,871. Hence, greater details with respect to explanation are deemed unnecessary.

The closure member 7 as indicated is provided with oppositely disposed disc halves joined at a central portion thereof by means of the preferably integral disc strut 13. Above the said strut connection and in oppositely disposed relation, each of the disc halves is provided with a suitable slotted recessed portion 14 for receiving the buttonhead 15 of the stem 9, the said buttonhead being provided at the innermost limit of the valve stem as illustrated.

The novel element of this invention resides in the torque plate generally designated 16 which is apertured polygonally at 17 to receive snugly the similar polygonally formed stem portion 18 to hold the stem non-rotatably relative to said torque plate. Above the stem polygonal portion 18 and for purpose of holding the torque plate against relative axial movement, the enlarged stem shoulder portion 19 is arranged on the stem and is of such extent as to overlie the apertured portion 17 in the torque plate 16.

Preferably, the stem 9 at an annularly inclined portion as shown is provided with the surface 20 to serve as the back-seating contact for the stem in the valve open position. Preferably extending below the backseating contact surface 20, the enlarged surface annular portion 21 is provided.

As shown more clearly in FIGS. 2 and 3, the opposite and side disposed ends of the torque plate 16 are formed with the slots 22 snugly engaging in slidable relation to the horseshoe guide 12, the said guide being disposed in the side walls diametrically opposite within the casing 1 as shown. As previously stated, the snugness of the fit of the said torque plate with the body guide 12 is substantially closer than that of the closure member with the said guide for the reasons stated.

Attention is now directed to the manner in which the transmission of the torque from the valve stem directly to the valve body is accomplished. This provision is necessary in order that the closure member will align itself to the valve seats unaffected by the forces of rotation. It will be appreciated that the torque plate 16 by virtue of its snug attachment to the valve stem 9 at the polygonal portion 18 provides for said torque plate to be firmly held against relative rotation. Further by virtue of the close contact of the slotted portions 22 of the said torque plate with the side surface portions of the horseshoe guide 12 the torque transmission benefit above referred to is easily and economically accomplished. Such arrangement thus avoids the objectionable condition in which valve seats and the contact surfaces of the closure member scratch, score, and gall as previously referred to. It will be appreciated that particularly where valves are in unusual positions in a pipeline as distinguished from being upright or vertical, the matter of proper support of the closure member in relation to the valve stem is a significant one. This is particularly true where the usual loose connection between the valve stem and the flexible wedge disc or closure member is applied. It will be appreciated in the latter connection that there is no impairment of the function of transverse adjustability of the flexible valve closure member in relation to the buttonhead of the stem. In no sense is there any interference with the performance of the torque plate to the end so that the usual T-head or buttonhead construction carries all the benefits it possessed before its assembly with the torque plate.

It will also be understood that depending upon the service conditions encountered in the field, the materials employed or selected for the torque plate 16 and/or the horseshoe guide 12 may be conveniently selected to meet the said service conditions without the necessity for overall changes in the other materials constituting the cooperating valve parts.

While in the previous embodiment, a flexible wedge gate closure member has been shown and described, it should of course be understood that the invention may be applied to a form of construction in which the valve stem is threadedly attached to the valve closure member. In this connection, attention is now directed to FIGS. 4 and 5 in which it will be noted that the flexible wedge closure member 7 is provided with the female thread 23 square in contour in each of the disc portions for receiving the innermost male threaded portion 24 of the stem which is similarly threaded to engage the threads of the recess 23. Depending from the unthreaded shank 25 of said stem, the said collar portion is positioned as shown above the threaded portion 24.

In a similar manner and for the same purpose as described in connection with the previous figures, the stem 9 is provided with the hexagonal projection or other suitable polygonal portion 26 engaging snugly the similar polygonally formed aperture 29 of the torque plate 28. Immediately above the polygonal portion of the stem at 26, an enlarged polygonal portion 27 is provided for restraining the torque plate 28 against axial movement thereby in effect providing a bearing against the said portion 26. In the same manner as above described, the stem 9 is provided with the enlarged shank portion 21 from which an inclined annular backseating surface 20 extends in the same manner and for the same purpose as previously described. In considering the function of this modified embodiment, it will be noted that the closure member 7 is of the flexible wedge type and the clearance between the threaded stem portion 24 and the disc portions 23 are preferably of such degree as to permit of a predetermined amount of transverse movement of the closure member in adjusting itself in its final seating on valve seats 8. It will be appreciated that by such clearances as referred to, the flexing of the wedge gate closure member will not be objectionably affected but will permit of such flexing as is necessary for adjustment purposes and avoiding sticking or binding in the closed position of the valve. The horseshoe or U-guide member 12 cooperates with the torque plate 28 in the same manner as above described and while one form of polygonal attachment is referred to it will be obvious that depending upon the size and type of valve installation the form of the polygonal connection therebetween may vary from a square to a many sided figure without objectionably interfering with the application of this invention.

Referring now to a further embodiment of this invention, attention is now directed to FIGS. 6 and 7 in which the rising stem gate valve illustrated is of the type commonly known to the trade as a double disc spring loaded parallel seated valve. In this construction, the valve closure member, generally designated 31, includes carrier 32. The said carrier supports a pair of separate disc halves 33 in juxtaposition which are held to the carrier by means of the circumferentially positioned pins 30 engaging the circumferentially extending groove 44 to perform said retaining function. The discs preferably, but not necessarily, are held in spaced-apart relation on the said carrier by means of the coil spring 34 interposed therebetween. The disc carrier 32 is provided with the female threads 35 to receive the inner end male threads 36 of the valve stem 9 as shown. Preferably, an integral boss member 37 is provided on the said disc carrier as illustrated to allow for sufficient stock to provide the threaded connection referred to.

Immediately above the male threaded portion 36 of the stem inner limit, a polygonal male stem portion 38 is provided snugly engaging the similar polygonally formed aperture 40 of the torque plate generally designated 39. It will be noted that the said torque plate at opposite end portions thereof in the manner previously described is provided with the male guides 41 engaging the oppositely disposed grooves 42 within the valve casing 1 as shown more clearly in the transverse section embodied in FIG. 7.

As shown more clearly in FIG. 6, it will be appreciated that in order to provide for the opening of the valve to its wide open position, the interior of the bonnet 11 is preferably provided with an extension of the grooves 42 in the casing as indicated at 43, the said grooves 42 and 43 being in axial alignment to provide for the movement of the valve closure member as referred to. In the same manner as previously described, the valve stem 9 is journally mounted within the bonnet 11. It will thus be appreciated that since the stem force is not used to tighten the valve in this embodiment and the only force closing the valve in a differential fluid pressure assisted by the spring force, it is accordingly more important not to transmit any torque forces to the closure member. In this design, the closure member remains also in the open position in contact with the valve seats and the disc carrier does not need to be guided since it is not affected by stem torque forces. The torque plate non-rotatably connected to the valve stem is closely guided in the groove 42 in the valve body thus preventing torque forces to be transmitted to the disc carrier. The screwed stem carrier connection cannot become loose while the valve is assembled, but can easily be disconnected outside the valve body.

Figure 8:
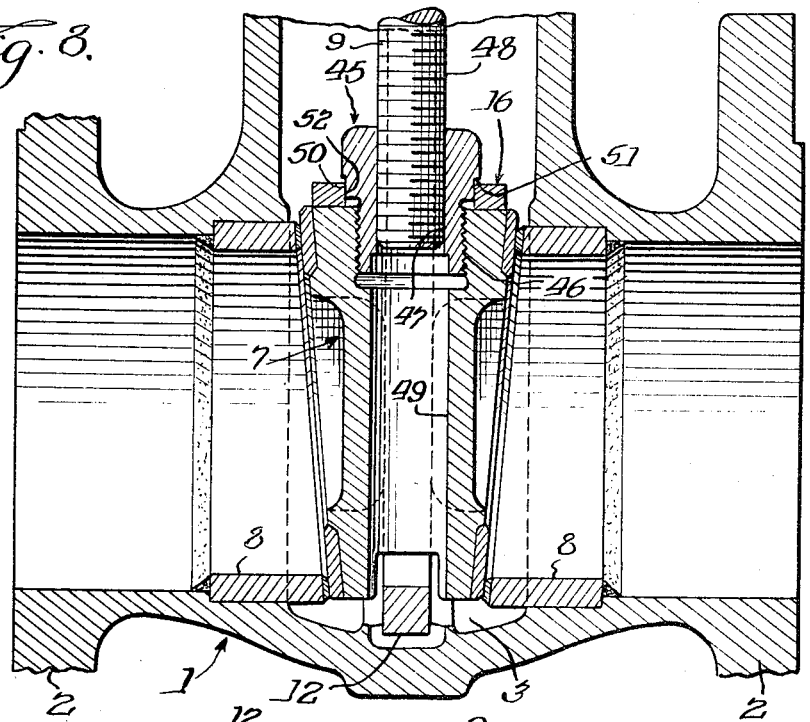
FIG. 8 is a further modified form of the invention applied to a non-rising stem gate valve.

Referring now to FIG. 8, a non-rising stem solid wedge type of valve construction is illustrated in which the valve closure member 7 is provided with the stem disc connecting bushing generally designated 45. The said bushing is provided with the female threads 46 engaging the closure member 7 as shown. It will be noted that the bushing member 45 is also provided with a through recess threaded as at 47 to receive the stem threads 48. In this construction, it will be understood that as the threads of the non-rising stem 48 are rotated by any suitable means the valve closure member 7 will be caused to move either upwardly or downwardly relative to the axially fixed stem, depending upon the direction of rotation. Thus the construction permits the threaded portion of the stem to enter the recess designated 49 in the valve closure member 7 when the valve is opened. In this construction, the bushing 45 is provided as indicated with the hexagonal projection 50 snugly engaging the hexagonal opening 52 in the torque plate 16 in the same manner and for the same purpose as previously described, thereby to effect a tight or close fit between the bushing 45 and the torque plate 16. A shoulder on the hexagonal bushing is preferably provided as at 51, allowing for an axial clearance as illustrated between the enlarged portion of the bushing 45 and the upper surface of the torque plate 16 for reasons hereinafter stated.

Figure 9:
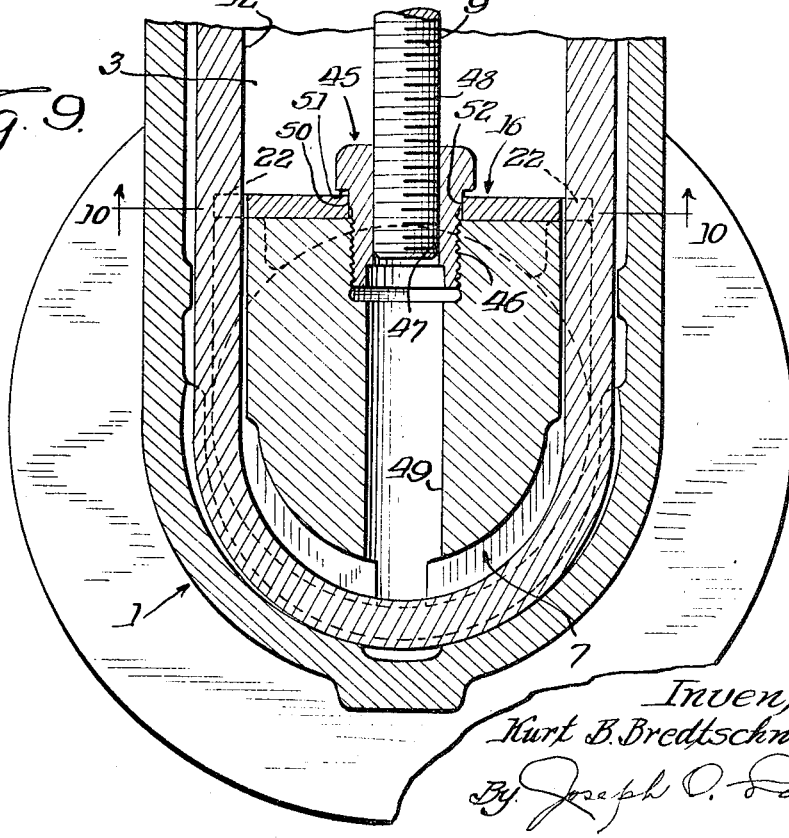
FIG. 9 is a sectional view taken at right angles to that shown in FIG. 8.

While the threads 46 in the bushing 45 have been shown as being of the V-type, it will of course be understood that again depending upon the nature of the service and the type of valve required, other forms of threads, such as the square or Acme type may be used with equally good results and without affecting the application of this invention. By reason of the axial clearance above referred to as existing between the torque plate 16 and the shoulder portion 51 of the bushing 45, the torque plate 16 has said slight amount of axial movement in the course of its operation as it engages the removable U-guide shown more clearly in FIGS. 9 and 10 in order to prevent the possibility of binding and permit the closure member to seat without restriction. Here, similarly, the type of valve employed varies substantially from that previously referred to, but, nevertheless, the torque plate 16 imparts to the valve construction the same desirable benefits referred to in the description of the other figures. In considering the number of modifications shown and described, it will of course be appreciated that the application of the invention is capable of use in many other forms of valves or similar types of controls and in devices other than valves where the torque load provision is desirable as above mentioned.

In this connection, while a plurality of embodiments have been described, this has been done only for purpose of illustrating the versatility and broad application of the invention without any desire to limit such invention to the specific figures illustrated. Therefore, the scope of the invention should be measured by the appended claims.

I claim:

1. In a torque resisting mechanism for gate valves or the like, the combination of a valve casing having side disposed internal guide means, a reciprocably movable closure member, a valve stem for actuating said closure member, connecting means between said valve stem and closure member, a torque plate surrounding said stem positioned between said closure member and an enlarged portion on said stem, the distance between said closure member and said enlarged portion being greater than the thickness of said plate to thereby permit limited axial movement of said plate, means provided by said stem for non-rotatably receiving said torque plate, the said torque plate having means for engaging said guide means to thereby prevent rotation of said stem and closure member relative to said casing.

2. The subject matter of claim 1, wherein the said means for non-rotatably receiving said torque plate include polygonal portions on said stem engaging complementary apertured portions in said torque plate.

3. The subject matter of claim 1, wherein the tolerance between the said torque plate and guide means is less than the tolerance between the closure member and guide means when the valve is in a closed position.

4. The subject matter of claim 1, the said closure member comprising a pair of spaced apart oppositely disposed disc halves, the said disc halves being connected at a central portion thereof by an integral disc strut, the said torque plate being disposed between said disc halves.

5. The subject matter of claim 1, the said connecting means comprising a depending threaded end portion on said valve stem loosely engaging a similarly threaded portion in the upper portion of said closure member.

6. The subject matter of claim 5, the said threaded portions being square in contour when viewed in tranverse section and having annular clearances between said threaded portions whereby to permit predetermined transverse movement of the said valve closure member relative to the said valve stem and flexibility in seating said valve closure member.

7. The subject matter of claim 1, the said closure member comprising a disc carrier and a pair of oppositely disposed disc halves in said carrier, said stem having a polygonal male portion thereon, said torque plate being mounted on said polygonal portion in non-rotatable relation thereto and being positioned between said disc carrier and said connecting means.

8. The subject matter of claim 7, the said valve stem at an inner end limit thereof being threadedly received within said carrier.

9. The subject matter of claim 7, a bonnet member co-operating with said valve casing and having internal guide means forming an extension of said casing guide means, said torque plate being movable in said guide means.

10. The subject matter of claim 1, the said torque plate being more closely guided in said casing than the said closure member so as to permit the closure member to align itself to the valve seats freely, unaffected by forces of rotation.

11. The subject matter of claim 4, wherein said closure member provides shoulder portions for support of said torque plate.

References Cited by the Examiner

UNITED STATES PATENTS

| 1,579,800 | 4/1926 | Williston | 251—327 X |
| 3,078,871 | 2/1963 | Magos | 251—329 X |

FOREIGN PATENTS 81,639   8/1956   Denmark.

M. CARY NELSON, *Primary Examiner.*

ARNOLD ROSENTHAL, *Examiner.*